United States Patent [19]

Dooley

[11] Patent Number: 4,624,824
[45] Date of Patent: Nov. 25, 1986

[54] REACTOR VESSEL SEALING PLUG
[75] Inventor: Ray A. Dooley, Rustburg, Va.
[73] Assignee: The Babcock & Wilcox Company, New Orleans, La.
[21] Appl. No.: 789,364
[22] Filed: Oct. 22, 1985

Related U.S. Application Data
[63] Continuation of Ser. No. 450,457, Dec. 15, 1982, abandoned.

[51] Int. Cl.[4] .................. G21C 19/04; G21C 19/20
[52] U.S. Cl. ..................................... 376/204; 376/260
[58] Field of Search .......................... 376/203–205, 376/260; 138/89–93

[56] References Cited
U.S. PATENT DOCUMENTS

| | | | |
|---|---|---|---|
| 3,494,504 | 2/1970 | Jackson | 220/24.5 |
| 3,613,936 | 10/1971 | Kaiser et al. | 220/24.5 |
| 3,653,410 | 4/1972 | West | 138/89 |
| 3,894,327 | 10/1973 | Jabsen | 29/200 R |
| 4,262,702 | 4/1981 | Streich | 138/89 |
| 4,265,011 | 5/1981 | Lebouc | 29/720 |
| 4,312,708 | 1/1982 | Leslie | 376/203 |
| 4,393,899 | 7/1983 | Tsuji et al. | 376/260 |
| 4,436,692 | 3/1984 | Stenabaugh | 376/204 |
| 4,470,946 | 9/1984 | Vassalotti et al. | 376/204 |
| 4,548,783 | 10/1985 | Dalke et al. | 376/204 |

Primary Examiner—Salvatore Cangialosi
Attorney, Agent, or Firm—R. J. Edwards; Mark B. Quatt

[57] ABSTRACT

An apparatus and method of sealing the cold leg nozzles of a reactor vessel during plant outages for reactor vessel inspection and core support maintenance includes insertion of a sealing plug into each of the cold leg nozzles, by means of an installation tool suspended within the vessel, to permit drainage of downstream piping and inspection and maintenance of associated steam generators and pumps.

7 Claims, 7 Drawing Figures

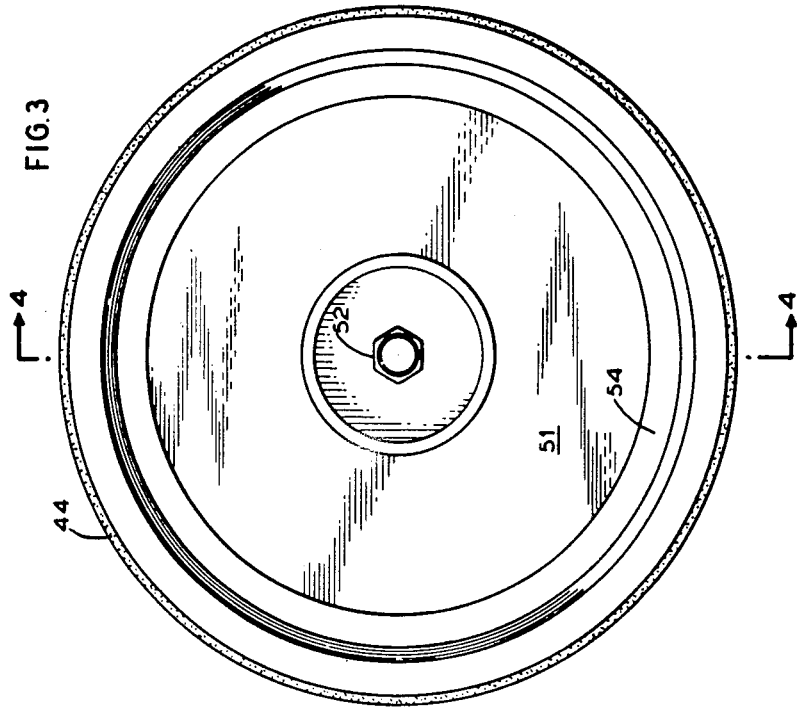
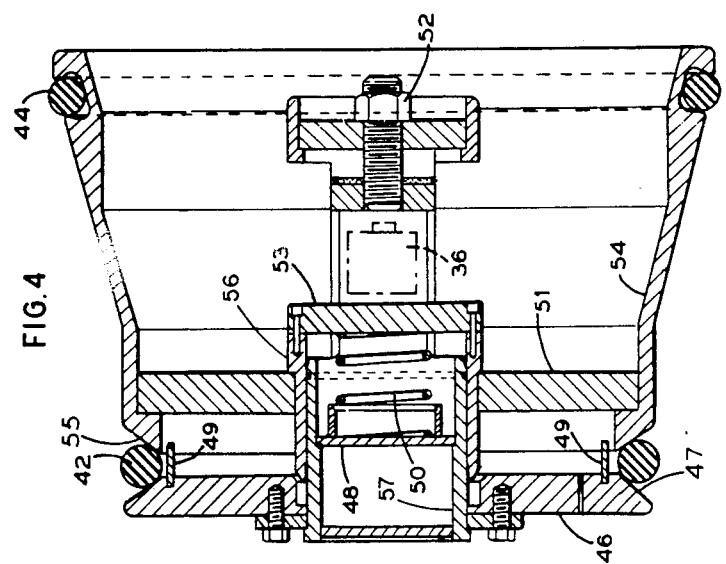

REACTOR VESSEL SEALING PLUG

This application is a continuation of application Ser. No. 06/450,457 filed Dec. 15, 1982, now abandoned.

BACKGROUND OF THE INVENTION

The invention relates to an apparatus and method for sealing the cold leg nozzles of a nuclear reactor pressure vessel, and more particularly sealing the cold leg nozzles during maintenance and inspection of associated steam generators and pumps.

In a typical nuclear steam supply system, the nuclear reactor vessel, as well as the steam generators and reactor coolant pumps must be periodically inspected. During the inspection and maintenance of the reactor vessel itself, the closure head is removed from the top of the reactor vessel, and the internals are removed from the interior of the vessel. The vessel and refueling canal are filled with water to act as a radiological shield during servicing. In a once through steam generator of the type manufactured by The Babcock & Wilcox Company, heated water travels through the top of the steam generator during operation and leaves at the bottom thereof. Reactor coolant pumps pump the water back into the reactor through an entrance nozzle, known as a cold leg nozzle which is situated in the same horizontal plane as the outlet nozzle. Thus the introduction of water into the reactor vessel during inspection and maintenance procedures would result in flooding of the lower portion of the steam generators, the reactor coolant pumps, and associated piping leading up to the cold leg nozzles. In the past, various plug arrangements have been suggested for sealing the cold leg piping to permit maintenance and inspection of the reactor coolant pump and lower portions of the steam generator during the inspection period in which the reactor vessel and refueling canal are filled with water. Such arrangements pose the threat of loosening or dislodgement of such a plug and flooding of the associated piping as indicated above.

Means for sealing or plugging pipelines in general are well known in the art, as shown for example by U.S. Pat. No. 4,262,702 (Streich). However, such plugs are not suitable for specialized application required by nuclear reactor maintenance and inspection.

It is therefore an object of the present invention to provide a sealing plug which is reliable in operation, and suitable for nuclear reactor inspection and maintenance procedures.

It is still another object of the invention to provide a plugging means which utilizes the hydrostatic pressure created by the water within the reactor pressure vessel to insure a fail safe plug which will not dislodge in the event of failure of the primary plug sealing means.

It is a further object of the invention to provide a method and apparatus for plugging the cold leg nozzles of a nuclear reactor pressure vessel during maintenance and inspection of same, to permit inspection and maintenance of the reactor coolant pumps, steam generators, and associated piping during the same period of time.

SUMMARY OF THE INVENTION

The present invention relates to an apparatus and method for sealing a cold leg nozzle of a nuclear reactor pressure vessel from a remote location during maintenance and inspection of the reactor coolant pumps, steam generators, and associated piping while the pressure vessel and refueling canal are filled with water. The apparatus includes a sealing plug for mechanically sealing the cold leg nozzle from the inside of a reactor pressure vessel. The sealing plugs include a primary and secondary O-ring. An installation tool is suspended within the reactor vessel and carries the sealing plug. The tool telescopes to insert the sealing plug within the cold leg nozzle, and to subsequently remove the sealing plug, after the completion of maintenance operations. Hydraulic means are used to activate the sealing plug, and support means serve to suspend the installation tool within the reactor vessel during installation and removal of the sealing plug.

BRIEF DESCRIPTION OF THE DRAWINGS

In the accompanying drawings forming a part of this specification, and in which reference numerals shown in the drawings designate like or corresponding parts throughout the same;

FIG. 3 is an end view of a sealing plug in accordance with the invention;

FIG. 4 is a sectional view of a sealing plug taken along line IV—IV of FIG. 3;

DESCRIPTION OF THE PREFERRED EMBODIMENTS

Figure 1:
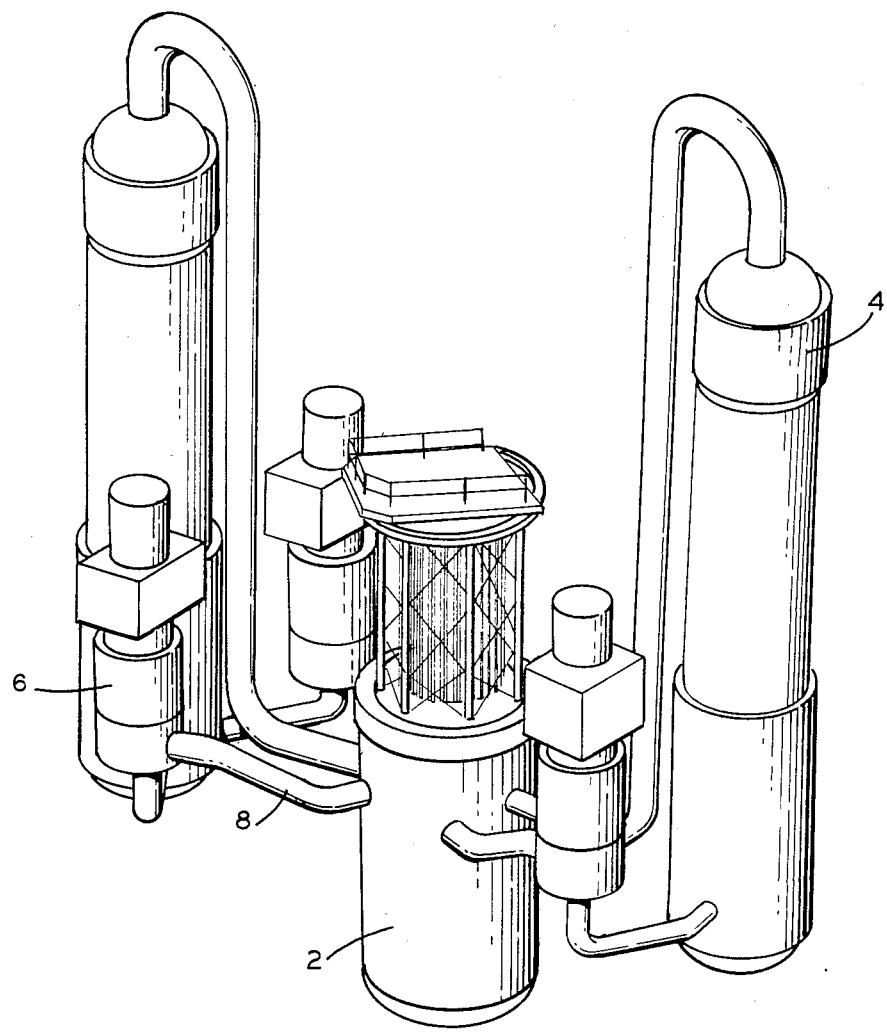
FIG. 1 is a perspective view of a nuclear steam supply system.

Referring to FIG. 1, a reactor vessel 2 is illustrated in relationship to a once through steam generator 4 and a reactor coolant pump 6. In the system as illustrated, each of two reactor coolant loops contain two reactor coolant pumps, i.e. a total of four pumps each feeding into the reactor vessel through a separate cold leg nozzle. The reactor coolant pump is connected to the reactor vessel by means of piping 8.

Figure 2:
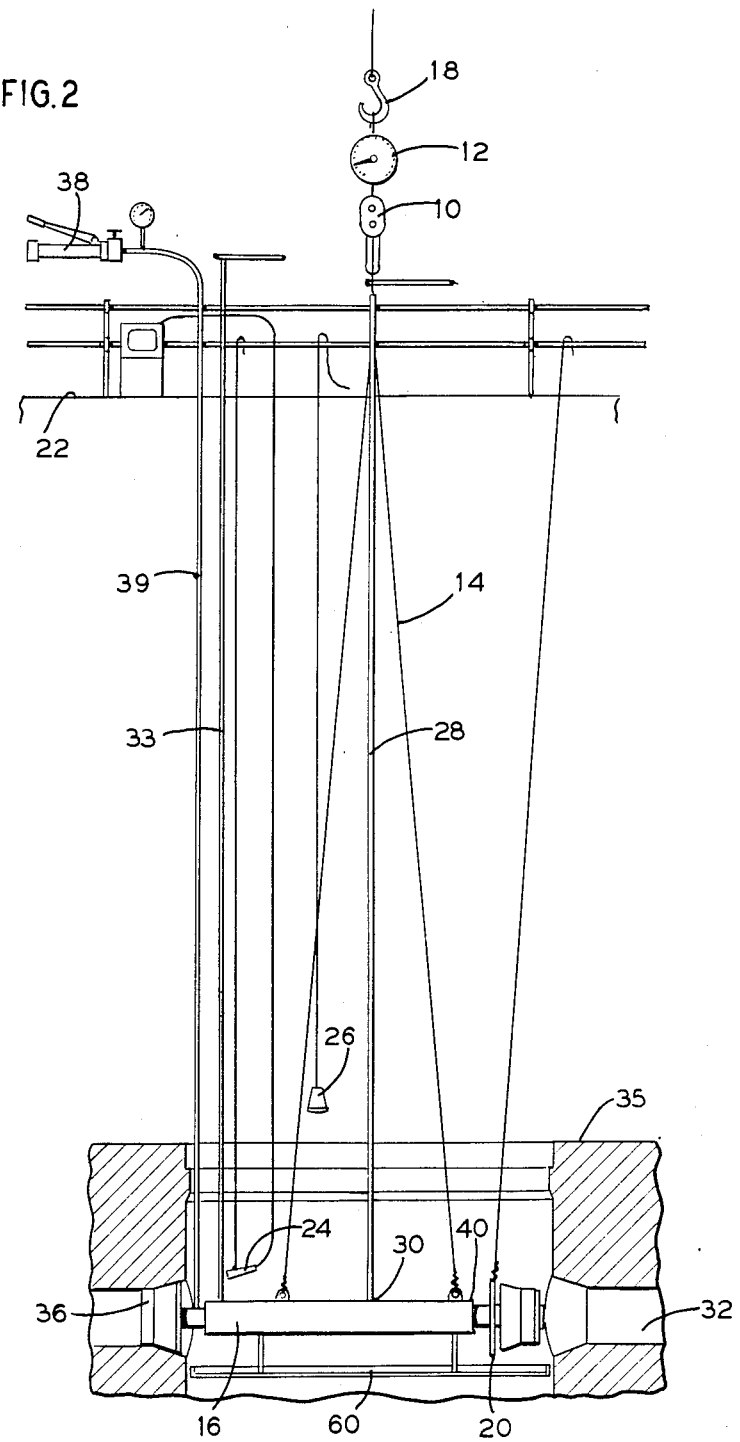
FIG. 2 is a schematic side view of an apparatus for installing a sealing plug in accordance with the invention.

Referring now to FIG. 2, a chain hoist 10, scales 12, a sling 14, and an installation tool 16 are attached to chain hook 18. The chain hoist is situated above the sling, and the scales are situated above the chain hoist, as illustrated. A sealing plug 20 is attached to each end of the installation tool. This is accomplished on a fuel handling bridge walkway 22. Because the operator is remote from the actual site of insertion of the sealing plug, a television camera 24 and an underwater light 26 are utilized to facilitate insertion and removal of the sealing plug in the practice of this invention. A first drive socket extension 28 is attached to a reaction nut 30 in the center of the installation tool.

The installation tool, now carrying a sealing plug at each end thereof, is aligned with a diametrically opposite cold leg nozzle 32. The tool is then lowered into the water-filled reactor vessel until it is in elevational alignment with the diametrically opposite cold leg nozzles. At this point in the procedure, the sealing plugs will be in the proper horizontal and vertical alignment for engagement in the cold leg nozzles.

The use of scales serves to establish a predetermined submerged weight for the installation tool, both with and without attached sealing plugs. Thus an aberration in apparent weight of the installation tool during the installation and subsequent removal of the sealing plugs would indicate to an operator that one or both plugs either rests on the lower conical section of a cold leg nozzle (abnormally low weight) or is pressed against the upper conical section of a cold leg nozzle (abnormally high weight). This would signal the operator to take appropriate action to correct the alignment of the installation tool. Turnbuckles or other adjusting means well known in the art may be used to adjust the sling, if necessary, to maintain the tool in an essentially level condition.

Before submergence of the installation tool with attached sealing plugs, the first drive socket extension is lowered until a socket end rests on a reactor vessel upper flange 35. The socket extension is then marked with tape at a suitable reference elevation on the fuel handling bridge walkway. A second tape mark is added to the socket extension six feet seven inches above the first mark, and the first mark is then removed. Six feet seven inches is the distance between the reactor vessel upper flange and the centerline of the cold leg nozzle in the preferred embodiment. Therefore, when the installation tool is lowered until the tape mark on the first drive socket extension coincides with the reference elevation on the fuel handling bridge walkway, the sealing plugs will be at the correct elevation for engagement into the nozzles. The chain hoist may be used to effect any change in tool elevation.

A second drive socket extension 33 is attached to a traverse nut 34 (see FIG. 5) in the center of the installation tool. A counterclockwise rotation of the traverse nut results in insertion of the sealing plugs into the cold leg nozzles. To prevent the installation tool and attached sealing plugs from rotating in a counterclockwise direction in a horizontal plane during rotation of the traverse nut, the first drive socket extension is attached to the reaction nut during this procedure.

After insertion of the sealing plugs into respective cold leg nozzles, a hydraulic jack 36 is inserted into a sealing plug and pressurized by means of hydraulic pump 38. The hydraulic jack is supported by a pole 39 made of fiberglass or other suitable material, the jack being connected to the hydraulic pump by lengths of hydraulic hosing. The jack is pressurized while holding some torque on the traverse nut; after pressurization of the hydraulic jack is achieved, torque on the traverse nut is released.

The hydraulic jack serves to activate the sealing plug and bring it in sealing relationship with the inside surface of the cold leg nozzle, as more fully described below. First drive socket extension 28 is removed from the reaction nut and placed on nut runner nut 40. The nut runner nut is then turned clockwise to effectively lock the sealing plug into a sealing relationship with the cold leg nozzle. The hydraulic jack is retracted, removed, and inserted in the diametrically opposite sealing plug, and the procedure as described above is repeated. After both plugs have been brought in sealing relationship with the inside diameters of respective cold leg nozzles, a nylon cord is used to release latches on each plug. The installation tool may then be removed. After completion of maintenance and inspection, the installation tool is again lowered into the reactor vessel, and telescoped into latching relationship with the installed plugs. The hydraulic jack is again inserted into each plug in turn to allow release of sealing relationship of each plug with the inside surface of its respective cold leg nozzle. The nut runner nut is turned counterclockwise as part of this operation. The diametrically opposite plugs are then withdrawn from their respective nozzles by rotating the traverse nut using the second drive socket extension. The installation tool, with plugs now reattached to the ends thereof, is now lifted out of the vessel. FIG. 3 illustrates an end view of the sealing plug in accordance with the invention. Hex nut 52 is in communication with the nut runner nut while the latter is being turned during the activation and well as deactivation of the sealing plug.

Referring now to FIG. 4, the sealing plug includes a primary O-ring 42, secondary O-ring 44, an outer plate 46, a spring retainer 48, and a spring 50. Upon pressurizng the hydraulic pump, the outer plate is pulled in a direction toward the center of the reactor vessel. Directional control is provided by outer pipe or tubular member 56, the inner pipe or tubular member 57, and the guide bar 49. As shown in FIG. 4, inner tubular member 57 is fixed to the outer plate 46 and the outer tubular member 56 is fixed to the cone assembly 54 via the locator ring 51. The inner tubular member 57 is coaxially received within the outer tubular member 56 for guided axial movement. Because a continuing pressure is being applied to the transverse nut 34 in the center of the installation tool, no significant net movement of the cone assembly 54 can occur in a direction toward the center of the reactor vessel. As shown in FIG. 4, the outer plate 46 and cone assembly 54 are provided with confronting bevelled edges 47 and 55, respectively, having an opening therebetween. The primary O-ring 42 is disposed about the opening and rests on the bevelled edges 47,55. The primary O-ring therefore expands radially outward between the beveled edges of the outer plate and cone assembly 54 as the plate 46 is moved toward the cone assembly 54. The hex nut is then turned, through communication with the nut runner nut, to lock the primary O-ring into position. Spring 50 is thus in a compressed state during the period in which the primary O-ring is in sealing relationship to the inside surface of the cold leg nozzle. Locator ring 51 and end ring 53 remain in a stationary position during this procedure.

When the sealing plug is to be removed, the hydraulic pump is again inserted into the plug and pressurized. The nut runner nut, in communication with the hex nut, is turned in a counterclockwise direction. The hydraulic jack is retracted and removed. The spring will force back the outer plate, thereby relieveing pressure on the primary O-ring and allowing it to return to its normal state. The sealing plug may then be removed from the cold leg nozzle prior to resumption of operation.

As shown in both FIG. 3 and FIG. 4, cone assembly 54 has a conical tapered body including a first end portion of smaller cross-section, bearing bevelled edge 55, and a second end portion of larger cross-section. A secondary O-ring 44 is mounted about the second end portion of the cone assembly 54. This secondary O-ring is designed to act as a sealing element in case of failure of the primary O-ring. Hydrostatic pressure would force the cone assembly and the secondary O-ring into tight communication with the beveled section of the cold leg nozzle.

Figure 5:
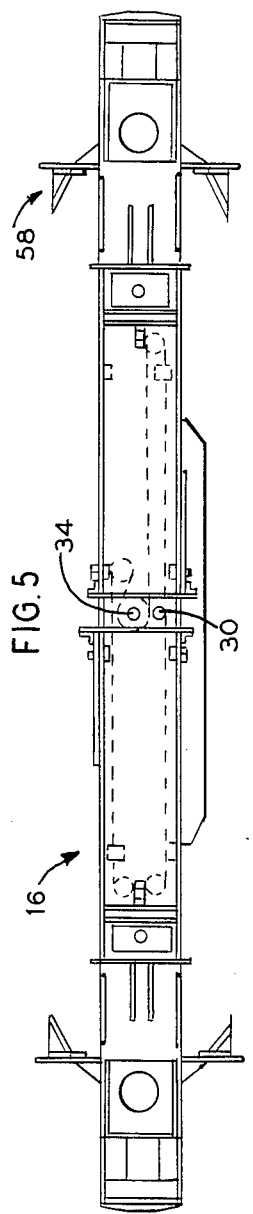
FIG. 5 is a plan view of an installation tool in accordance with the invention.
Figure 6:
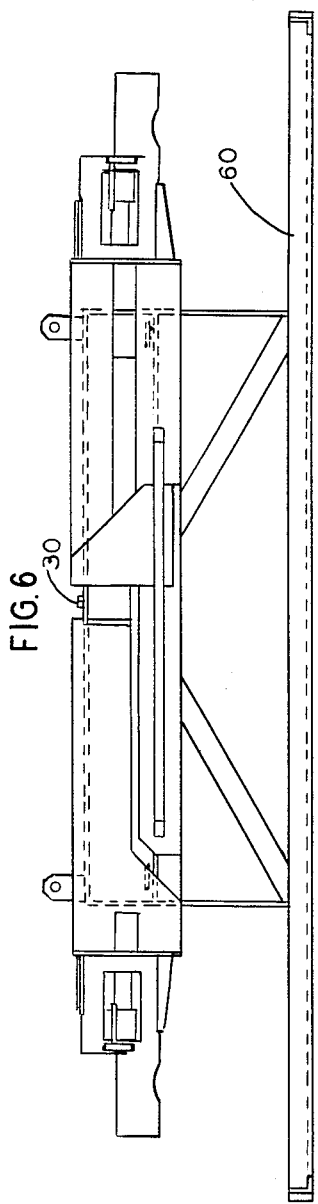
FIG. 6 is a side view of the installation tool and attached reaction beam in accordance with the invention.
Figure 7:
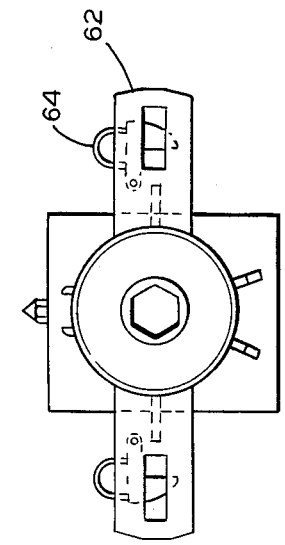
FIG. 7 is an end view of a latch assembly in accordance with the invention.

As best shown in FIGS. 5 and 6, an installation tool utilizes a continuous chain drive operated by rotation of the traverse nut 34 by means of the second drive socket extension. Thus by turning the traverse nut counterclockwise, the two principal members of the installation tool will simultaneously telescope radially outward, as for example during insertion of the sealing plugs into respective cold leg nozzles. Conversely, clockwise rotation of the traverse nut results in simultaneous retraction of the telescoping members of the installation tool in a radially inward direction, as for example during removal of the sealing plugs from respective nozzles. Installation tool 16 is also provided with a latch assembly 58, shown in more detail in FIG. 7. In that figure, latch plate 62 contains slots for the introduction of lugs (not shown), two of which lugs are arranged on a sealing plug. Latch 64 engages the sealing plug lug to provide attachment of the sealing plug to each end of the installation tool before insertion of the plugs into respective cold leg nozzles. After insertion, a nylon cord tied to the latch is pulled up, releasing the lug from the latch and thereby permitting withdrawal of the installation tool from the positioned plug. For removal of the plugs, the latch is reconnected to the lug, if necessary with the aid of a drive socket extension.

FIG. 6 shows a side view of the installation tool, including a reaction beam 60.

During removal of the two oppositely disposed sealing plugs, if one of the plug releases from the nozzle while the oppositely disposed plug still maintains some resistance to the installation tool, it is necessary to have a means to react against the force exerted by the tool. The reaction beam is slightly less in diametric length than the inside diameter of the reactor vessel. In the event of a situation as described above, the reaction beam will come in contact with the inner surface of the reactor vessel side wall, and in arcuate alignment with the respective nozzle, so as to provide the reactive force.

The entire procedure described above is with respect to two sealing plugs, one at each end of an installation tool, the plugs being inserted into diametrically opposite cold leg nozzles and subsequently removed. In a typical reactor vessel such as illustrated in FIG. 1, it is necessary to seal all four cold leg nozzles before maintenance and inspection may be started. Therefore the essential procedures of this invention are repeated with respect to a third and fourth sealing plug and corresponding, diametrically opposite cold leg nozzles.

Ancillary equipment may be used in conjunction with the practice of the invention. For example, a suitable lubricant may be used on installation tool surfaces that interface with the sealing plug to facilitate the insertion and removal of the plug into the cold leg nozzle.

Certain features of this invention may sometimes be used to advantage without a corresponding use of the other features. It is also to be understood that the invention is by no means limited to the specific embodiments which have been illustrated and described herein, and that various modifications may indeed be made within the scope of the present invention as defined by the claims.

The embodiments of the invention in which an exclusive property or privilege is claimed are defined as follows:

1. An apparatus for sealing a cold leg nozzle of a nuclear reactor pressure vessel from a remote location comprising: at least one sealing plug for mechanically sealing the nozzle from the inside of the reactor pressure vessel, the sealing plug including a plate and a cone assembly having an end part receptive in the nozzle, the plate being axially moveable relative to the cone assembly, the plate and cone assembly having confronting bevelled edges defining an opening therebetween, a primary O-ring disposed about said opening and being supported on the bevelled edges, the plate being guidably mounted to the cone assembly for movement toward said cone assembly to radially expand the primary O-ring into sealing engagement with the nozzle, and means for providing relative movement between the outer plate and the cone assembly.

2. An apparatus as set forth in claim 1 further comprising means for guiding the movement of the plate relative to the cone assembly including an outer tubular member fixedly mounted to the cone assembly and an inner tubular member mounted to the plate and coaxially received within the outer tubular member for guided axial movement.

3. An apparatus as set forth in claim 2 further comprising a plurality of sealing plugs, an elongated installation tool, one of the sealing plugs being mounted on each end of the tool, and means for mechanically telescopically moving the tool to move at least part of said sealing plug into or out of the cold leg nozzle.

4. The apparatus as set forth in claim 3 further comprising latching means for attaching the sealing plugs to the installation tool.

5. The apparatus as set forth in claim 3 further comprising means inserted into said plugs for hydraulically activating relative movement of the plate and cone assembly.

6. The apparatus as set forth in claim 3 further comprising support means for suspending the installation tool within the reactor vessel.

7. The apparatus as set forth in claim 3 wherein the cone assembly comprises a conical tapered body including a first end portion of smaller cross-section bearing the bevelled edge and a second end portion of a larger cross-section, and further comprising a secondary O-ring mounted about the second end portion.

* * * * *